INVENTOR
CRAVENS L. WANLASS
BY HIS ATTORNEYS
HARRIS, KIECH, RUSSELL & KERN

United States Patent Office 2,983,829
Patented May 9, 1961

2,983,829
FLIP-FLOP CIRCUIT

Cravens L. Wanlass, Woodland Hills, Calif., assignor to Ford Motor Company, Dearborn, Mich., a corporation of Delaware Filed July 31, 1959, Ser. No. 830,840

5 Claims. (Cl. 307—88)

This invention relates to flip-flop circuits and in particular to a flip-flop circuit using magnetic components and orthogonal magnetic fields.

It is an object of the invention to provide a circuit having the output characteristics of a conventional vacuum tube or transistor flip-flop and one which is useable in pulse applications. A further object is to provide a circuit which will receive an input having one of two possible states, ordinarily referred to as "zero" and "one," and on interrogation, as by a clock or sense pulse, will provide a corresponding output. A further object is to provide such a circuit which produces a first output on one line and a second output which is the inverse of the first output on a second line.

It is an object of the invention to provide a flip-flop circuit utilizing orthogonal magnetic fields wherein the output is independent of the polarity of the clock pulse, being dependent only on the input or set current. A further object is to provide a flip-flop circuit which can be manufactured in the same manner as the magnetic circuits of my copending application entitled Logic System Gating Circuit, Serial No. 689,622, filed October 11, 1957.

It is an object of the invention to provide a flip-flop circuit utilizing first and second blocks of magnetic material each having mutually perpendicular output and clock axes, means for establishing magnetic fluxes about each of the output axes independently, means for producing magnetic fluxes about each of the clock axes simultaneously, and means for determining changes in the flux conditions about the output axes produced by the fluxes about the clock axes. A further object is to provide such a circuit including means for combining the outputs due to flux changes about the output axes both additively and subtractively to provide two output signals, one being the inverse of the other.

It is also an object of the invention to provide a flip-flop circuit having first and second blocks of magnetic material, a clock conductor passing through each of said blocks, at least one output conductor passing through each of said blocks spaced from and perpendicular to the clock conductor, and at least one set conductor passing through one of the blocks parallel and adjacent to the output conductor. A further object is to provide such a circuit including means for coupling set currents to the set conductor for establishing magnetic fluxes about the output conductor in the one block, with a reference flux being established about the output conductor in the other block, and means for connecting a clock current to the clock conductor for interrogating the circuit and producing an output signal on the output conductor as the result of the orthogonal relationships of the magnetic fluxes within the magnetic materials.

The invention also comprises novel details of construction and novel combinations and arrangements of parts, which will more fully appear in the course of the following description. The drawing merely shows and the description merely describes preferred embodiments of the present invention which are given by way of illustration or example.

Figure 1:
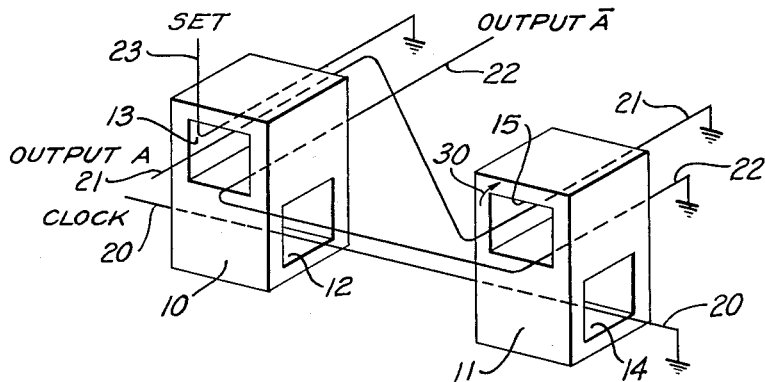
Fig. 1 is an isometric view of a preferred form of the invention.

The flip-flop circuit of the present invention is operated in the same manner as a conventional vacuum tube flip-flop. The circuit is provided with an input or set line and two output lines identified as "A" and "Ā." With a "one" input, there is an output signal on the A line and no signal on the Ā line, and, with a "zero" input, there is an output signal on the Ā line and no signal on the A line.

The flip-flop circuit includes blocks 10, 11 of magnetic material having orthogonal openings 12, 13 ad 14, 15, respectively, therethrough. The particular type of material utilized is not critical, but it should have sufficient hysteresis characteristics such that magnetic retentivity is present. The ferrite materials presently available are suitable from the manufacturing view and provide satisfactory operation of the flip-flop circuit. While the magnetic structure of the circuit is illustrated and described herein as two separate pieces of material, it is understood that two zones of a single piece of magnetic material may be utilized. For example, the orthogonal field magnetic structures shown in my copending application entitled Logic System Gating Circuit, Serial No. 689,622, filed October 11, 1957, may be utilized.

A conductor 20, which may be referred to as the "clock" or "sense" conductor, is positioned in the openings 12 and 14. Another conductor 21, which may be referred to as the "output A" conductor, is positioned in the openings 13 and 15. A third conductor 22, which may be referred to as the "output Ā" conductor, is also positioned in the openings 13 and 15. However, the output conductors are disposed so as to pass through one opening in opposite directions, here the opening 13, and through one opening in the same direction, here the opening 15. Another conductor 23, which may be referred to as the "set" conductor, is positioned in the opening 13. It should be noted that while each of the conductors is shown passing through an opening as a single turn winding, the circuit of the invention is not so restricted. The particular number of times a conductor passes through an opening is dependent upon the specific application of the unit, a single turn providing the fastest operating time and having the largest current requirements. Conversely, conductors making a large number of turns will produce limited operating speeds, while requiring smaller currents for proper operation.

Figure 2:
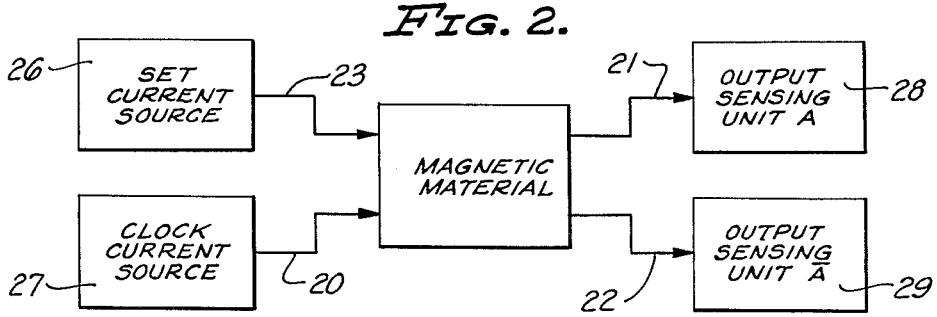
Fig. 2 is a block diagram of a circuit embodying the invention.

The diagram of Fig. 2 illustrates one mode of use of the flip-flop circuit. A set current source 26 is connected to the set conductor 23 to provide the required "one" or "zero" input. A clock current source 27 is connected to the clock conductor 20 to provide a clock current pulse for interrogating the unit and producing the output signal which appears on one of the output conductors 21, 22. The clock current source for the flip-flop circuit will ordinarily be the same source used to produce the clock pulses for the entire system in which the flip-flop circuit is incorporated. The output conductors 21, 22 are connected to output sensing units 28, 29, respectively, which may be merely voltage measuring devices or may be more complex circuits designed for using the flip-flop outputs in subsequent operations.

In the operation of the circuit, a reference magnetic flux is established in the block 11 about the conductors 21, 22 in the opening 15. The reference flux will be of a known direction and in the example given herein will be considered as being clockwise, as indicated by the arrow 30. This clockwise reference flux will be referred to as a "positive" flux corresponding to a "one." This reference magnetic flux may be established by applying a positive current pulse to either of the conductors 21, 22 or by temporarily inserting a conductor through the opening 15 and applying a positive current pulse thereto. Then a "one" may be stored in the flip-flop by applying a positive current pulse to the set conductor 23 to establish a positive magnetic flux around the conductors in the opening 13 and a "zero" may be stored in the flip-flop by applying a negative current pulse to the set conductor to establish a negative magnetic flux about the opening 13. Of course, the relation given for positive, negative, zero and one are arbitrary and any relation may be selected.

The flip-flop circuit is interrogated by applying a current pulse to the clock conductor 20. Because of the orthogonal field relationship of the circuit, the polarity of the clock pulse is not significant. The clock current produces an increase in flux about the clock conductor in each of the blocks and, because of the orthogonal field relationship, a decrease in the flux about the output conductors. The flux decrease induces a current in each of the output conductors with the polarity of the current being a function only of the initial polarity of the flux in the material about the conductor.

If a "one" is stored in the flip-flop, the polarities of the fluxes about the output conductors will be the same and the signals induced in the output conductor 21 will add to produce an output signal. Correspondingly, the signals produce on the output conductor 22 will subtract, resulting in substantially zero output signal. Similarly, if a "zero" is stored in the flip-flop by a negative current on the set conductor 23, interrogation by the clock pulse produces the flux decrease about the output conductors with the induced signal adding on the conductor 22 and subtracting on the conductor 21.

Figure 3:
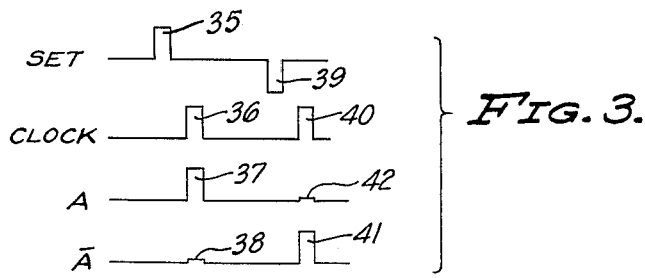
Fig. 3 is a graph showing the inputs and outputs of the circuit.

A graph of the operation of the flip-flop circuit is shown in Fig. 3. A "one" is set in the unit by a set pulse 35. The next clock pulse 36 then produces an output pulse 37 on the output A conductor 21. There may be a very small output pulse 38 on the output $\bar{A}$ conductor 22, due to unbalances in the circuit. A "zero" may be set in the flip-flop by the next set pulse 39 and the following clock pulse 40 will produce an output pulse 41 on the output $\bar{A}$ conductor, with possibly a very small pulse 42 on the output A conductor.

As previously stated, the polarity of the clock pulse is not significant, the only requirement being a build-up in flux about the clock axis. The magnitude of the output signal is a function of the magnitude of flux change about the clock axis. Hence, increased output signal can be obtained by making successive clock pulses of alternate polarity or by alternately pulsing two clock conductors which pass through the openings in opposite directions. Also, if substantially square loop magnetic material is utilized, the clock pulses should be of alternating polarity since the material about the clock axis would remain substantially saturated following a clock pulse. With higher frequency of operation, it is preferred to use non-square loop material and clock pulses of a single polarity, thereby reducing the magnitude of flux change about the clock axis and hence reducing the minimum operating time and the heating of the material.

In the embodiment illustrated in Fig. 1, "ones" and "zeros" are set by applying positive and negative current pulses respective to the set conductor 23. Alternatively, two set conductors can be used passing through the opening 13 in opposite directions so that pulses of the same polarity can be used for setting both "ones" and "zeros," the particular set condition depending upon the particular set conductor that is energized. For applications of the circuit where only a single output having a signal and no-signal condition is required, one of the output conductors 21, 22 may be omitted.

It should be noted that the flip-flop circuit of the present invention may be manufactured according to the methods and in the forms shown in my aforesaid copending application Serial 689,622. Although exemplary embodiments of the invention have been disclosed and discussed, it will be understood that other applications of the invention are possible and that the embodiments disclosed can be subjected to various changes, modifications and substitutions without necessarily departing from the spirit of the invention.

I claim as my invention:

1. In a flip-flop circuit, the combination of: a first block of magnetic material having two stable states of magnetic remanence, and having first and second current axes therethrough perpendicular to each other, and including a first flux path about said first axis, and a second flux path about said second axis intersecting and perpendicular to said first flux path; a second block of magnetic material having two stable states of magnetic remanence, and having third and fourth current axes therethrough perpendicular to each other, and including a third flux path about said third axis, and a fourth flux path about said fourth axis intersecting and perpendicular to said third flux path, and having a reference flux stored in said third flux path; first means for generating a control flux about said first axis of a magnitude to store a flux in said first flux path; second means for generating a clock flux in said second and fourth paths about said second and fourth axes simultaneously; and output means for determining flux changes occurring about said first and third axes during operation of said second means.

2. In a flip-flop circuit, the combination of: a first block of magnetic material having two stable states of magnetic remanence, and having first and second current axes therethrough perpendicular to each other, and including a first flux path about said first axis, and a second flux path about said second axis intersecting and perpendicular to said first flux path; a second block of magnetic material having two stable states of magnetic remanence, and having third and fourth current axes therethrough perpendicular to each other, and including a third flux path about said third axis, and a fourth flux path about said fourth axis intersecting and perpendicular to said third flux path; first means for generating a control flux about said first axis of a magnitude to store a flux in said first flux path; second means for generating a control flux about said third axis of a magnitude to store a flux in said third flux path; third means for generating a clock flux in said second and fourth paths about said second and fourth axes simultaneously; and output means for determing flux changes occurring about said first and third axes during operation of said third means, with the relative polarity of the flux changes corresponding to the relative polarity of said control fluxes and being independent of the polarity of said clock fluxes.

3. In a flip-flop circuit, the combination of: a first block of magnetic material having two stable states of magnetic remanence, and having first and second openings therethrough perpendicular to each other, and including a first flux path about said first opening, and a second flux path about said second opening intersecting and perpendicular to said first flux path; a second block of magnetic material having two stable states of magnetic remanence, and having third and fourth openings therethrough perpendicular to each other, and including a third flux path about said third opening, and a fourth flux path about said fourth opening intersecting and perpendicular to said third flux path, and having a reference flux stored in said third flux path; a first conductor positioned in said first opening for generating a control flux about said first opening of a magnitude to store a flux in said first flux path; a second conductor positioned in said second and fourth openings for generating a clock flux in said second and fourth paths about said second and fourth openings simultaneously; and output means for determining flux changes occurring in said first and third paths during generation of said clock flux.

4. In a flip-flop circuit, the combination of: a first block of magnetic material having two stable states of magnetic remanence, and having first and second openings therethrough perpendicular to each other, and including a first flux path about said first opening, and a second flux path about said second opening intersecting and perpendicular to said first flux path; a second block of magnetic material having two stable states of magnetic remanence, and having third and fourth openings therethrough perpendicular to each other, and including a third flux path about said third opening, and a fourth flux path about said fourth opening intersecting and perpendicular to said third flux path, and having a reference flux stored in said third flux path; a first conductor positioned in said first opening for generating a control flux about said first opening of a magnitude to store a flux in said first flux path; a second conductor positioned in said second and fourth openings for generating a clock flux in said second and fourth paths about said second and fourth openings simultaneously; and two output conductors positioned in said first and third openings, with said output conductors passing through one of said openings in the same direction and through the other in the opposite direction.

5. In a flip-flop circuit, the combination of: a first block of magnetic material having two stable states of magnetic remanence, and having first and second current axes therethrough perpendicular to each other, and including a first flux path about said first axis, and a second flux path about said second axis intersecting and perpendicular to said first flux path; a second block of magnetic material having two stable states of magnetic remanence, and having third and fourth current axes therethrough perpendicular to each other, and including a third flux path about said third axis, and a fourth flux path about said fourth axis intersecting and perpendicular to said third flux path, and having a reference flux of a predetermined polarity stored in said third flux path; first means for generating a control flux about said first axis of a magnitude to store a flux of a predetermined polarity in said first flux path; second means for generating a clock flux in said second and fourth paths about said second and fourth axes simultaneously and producing a decrease in flux in said first and third paths; and output means for determining flux changes occurring about said first and third axes during operation of said second means with the polarity of the changes being functions of the respective stored fluxes and independent of the clock fluxes.

References Cited in the file of this patent

UNITED STATES PATENTS 2,802,953    Arsenault et al. _____ Apr. 13, 1957